(12) United States Patent
Matsushita

(10) Patent No.: US 11,048,152 B2
(45) Date of Patent: Jun. 29, 2021

(54) PROJECTION-TYPE IMAGE DISPLAY APPARATUS DISPLAYING IMAGE USING TWO REFELECTIVE DISPLAY ELEMENTS

(71) Applicant: Panasonic Intellectual Property Management Co., Ltd., Osaka (JP)

(72) Inventor: Junko Matsushita, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/707,130

(22) Filed: Dec. 9, 2019

(65) Prior Publication Data
US 2020/0183261 A1 Jun. 11, 2020

(30) Foreign Application Priority Data

Dec. 10, 2018 (JP) .............................. JP2018-230621

(51) Int. Cl.
*G03B 21/00* (2006.01)
*G02B 26/00* (2006.01)
(Continued)

(52) U.S. Cl.
CPC ......... *G03B 21/005* (2013.01); *G02B 26/008* (2013.01); *G03B 21/2013* (2013.01); *G03B 21/2033* (2013.01); *H04N 9/31* (2013.01)

(58) Field of Classification Search
CPC .... G03B 21/005; G03B 21/008; G03B 21/28; G03B 21/2013; G03B 21/2033;
(Continued)

(56) References Cited

U.S. PATENT DOCUMENTS 6,771,325 B1 8/2004 Dewald et al.
2006/0215121 A1* 9/2006 Hoffman .............. H04N 9/3114
353/31
(Continued)

FOREIGN PATENT DOCUMENTS

JP 2001-242416 9/2001
JP 2010-97002 4/2010
(Continued)

*Primary Examiner* — Sultan Chowdhury
(74) *Attorney, Agent, or Firm* — Wenderoth, Lind & Ponack, L.L.P.

(57) ABSTRACT

A projection-type image display apparatus is provided with a light source, a disk, a color separator, and first and second modulation elements. The disk generates color lights in a time-division manner based on emission light from the light source unit, and the color separator separates first, second, and third primary colors from the color lights generated by the disk. The first light modulation element modulates the separated first and second primary colors according to an input first image signal to generate a first image light, and the second light modulation element that modulates the separated third primary color according to an input second image signal to generate a second image light. A control circuit controls the first and second light modulation elements such that the second light modulation element becomes an ON-state during a spoke period of the disk upon displaying the third primary color as a single color.

3 Claims, 8 Drawing Sheets

(51) Int. Cl.
*G03B 21/20* (2006.01)
*H04N 9/31* (2006.01)

(58) Field of Classification Search
CPC ...... G03B 21/2053; H04N 9/31; H04N 9/315;
H04N 9/3102; H04N 9/3108; H04N
9/3114; H04N 9/3117; H04N 9/3152;
H04N 9/3155; H04N 9/3161; H04N
9/3164; H04N 9/3182
See application file for complete search history.

(56) References Cited

U.S. PATENT DOCUMENTS

| | | | |
|---|---|---|---|
| 2013/0114049 A1* | 5/2013 | Li | H04N 9/3117 353/84 |
| 2013/0242534 A1* | 9/2013 | Pettitt | H04N 13/363 362/84 |
| 2014/0347634 A1* | 11/2014 | Bommerbach | H04N 9/3158 353/31 |
| 2016/0119595 A1* | 4/2016 | Lyubarsky | G02B 27/145 353/20 |
| 2017/0048501 A1 | 2/2017 | Li et al. | |
| 2018/0095353 A1 | 4/2018 | Ishikawa | |
| 2018/0157028 A1* | 6/2018 | Liao | G02B 26/008 |
| 2019/0098265 A1* | 3/2019 | Takahama | H04N 9/3114 |

FOREIGN PATENT DOCUMENTS

| | | |
|---|---|---|
| JP | 2017-514178 | 6/2017 |
| WO | 2016/166885 | 10/2016 |

* cited by examiner

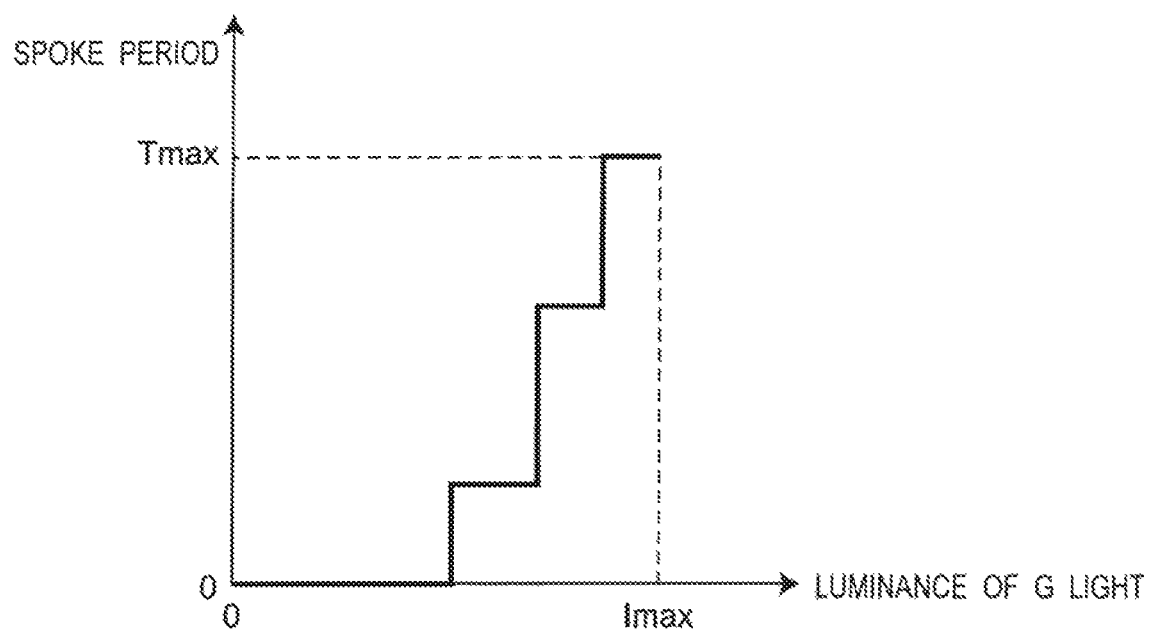

PROJECTION-TYPE IMAGE DISPLAY APPARATUS DISPLAYING IMAGE USING TWO REFELECTIVE DISPLAY ELEMENTS

BACKGROUND OF THE INVENTION

1. Field of the Invention

The present disclosure relates to a two-plate projection-type image display apparatus, which displays an image using two reflective display elements, for example.

2. Description of Related Art

A conventional single-plate projection-type image display apparatus uses a disk, which includes arc-shaped portions provided on the disk to convert input light into red light, green light, blue light and the other color lights and emit the converted lights, and applies spot-shaped light to the disk while rotating the disk to obtain light, which changes color with time. This display apparatus projects the light, which changes color with time as a light source to a light modulation element, and projects output light from the light modulation element via a projection lens to achieve color display.

In addition, Patent Document 1 discloses a two-plate projection apparatus, which includes a total internal reflection (TIR) prism, a dichroic prism, two reflective spatial light modulation elements, and a polarization element.

PRIOR ART DOCUMENT

Patent Document

Patent Document 1: Japanese Patent Laid-open Publication No. JP2010-97002A.

The light applied to the disk is a spot of light having a finite size. Light at a boundary of the colors of the disk is in a state of mixture of adjacent colors, and is difficult to use to produce three primary colors of the light source of the projection-type image display apparatus. Accordingly, the light at the boundary is difficult to use by a single color display unit, and thus lowers intensity of the three primary colors.

SUMMARY OF THE INVENTION

The present disclosure provides a projection-type image display apparatus having a two-plate configuration using two reflective display elements, and capable of preventing a drop of intensity of one primary color as compared with the prior art.

According to one aspect of the disclosure, there is provided a projection-type image display apparatus with a light source, a disk, a color separator, a first light modulation element, a second light modulation element, and a control circuit. The disk generates a plurality of color lights in a time-division manner based on emission light from the light source unit, and the color separator that separates first, second, and third primary colors from the plurality of color lights generated by the disk. The first light modulation element that modulates the separated first and second primary colors according to an input first image signal to generate a first image light, and the second light modulation element that modulates the separated third primary color according to an input second image signal to generate a second image light. The control circuit is configured to control the first and second light modulation elements such that the second light modulation element becomes an ON-state during a spoke period of the disk upon displaying the third primary color as a single color.

According to the present disclosure, there is provided a projection-type image display apparatus capable of preventing a drop of intensity of a third primary color by using all lights in the third primary color to produce the primary color.

BRIEF DESCRIPTION OF THE DRAWINGS

FIG. 4B is a graph showing characteristics during a spoke period for luminance of G light used in the projection-type image display apparatus of FIG. 1;

EMBODIMENTS

Embodiments will be hereinafter described in detail with reference to the drawings when appropriate. It is noted that excessively detailed description may be omitted. For example, detailed description of well-known matters and repeated explanation on substantially the same configuration may be omitted. These omissions are made to avoid unnecessary redundancy of following descriptions, and to help easy understanding by those skilled in the art.

The inventor of the present invention provides the accompanying drawings and the following description to help those skilled in the art sufficiently understand the present disclosure. The drawings and description are therefore not intended to limit the subject matters claimed in the appended claims.

First Embodiment

A first embodiment will be hereinafter described with reference to FIGS. 1 to 4B.

Projection-Type Image Display Apparatus

Figure 1:
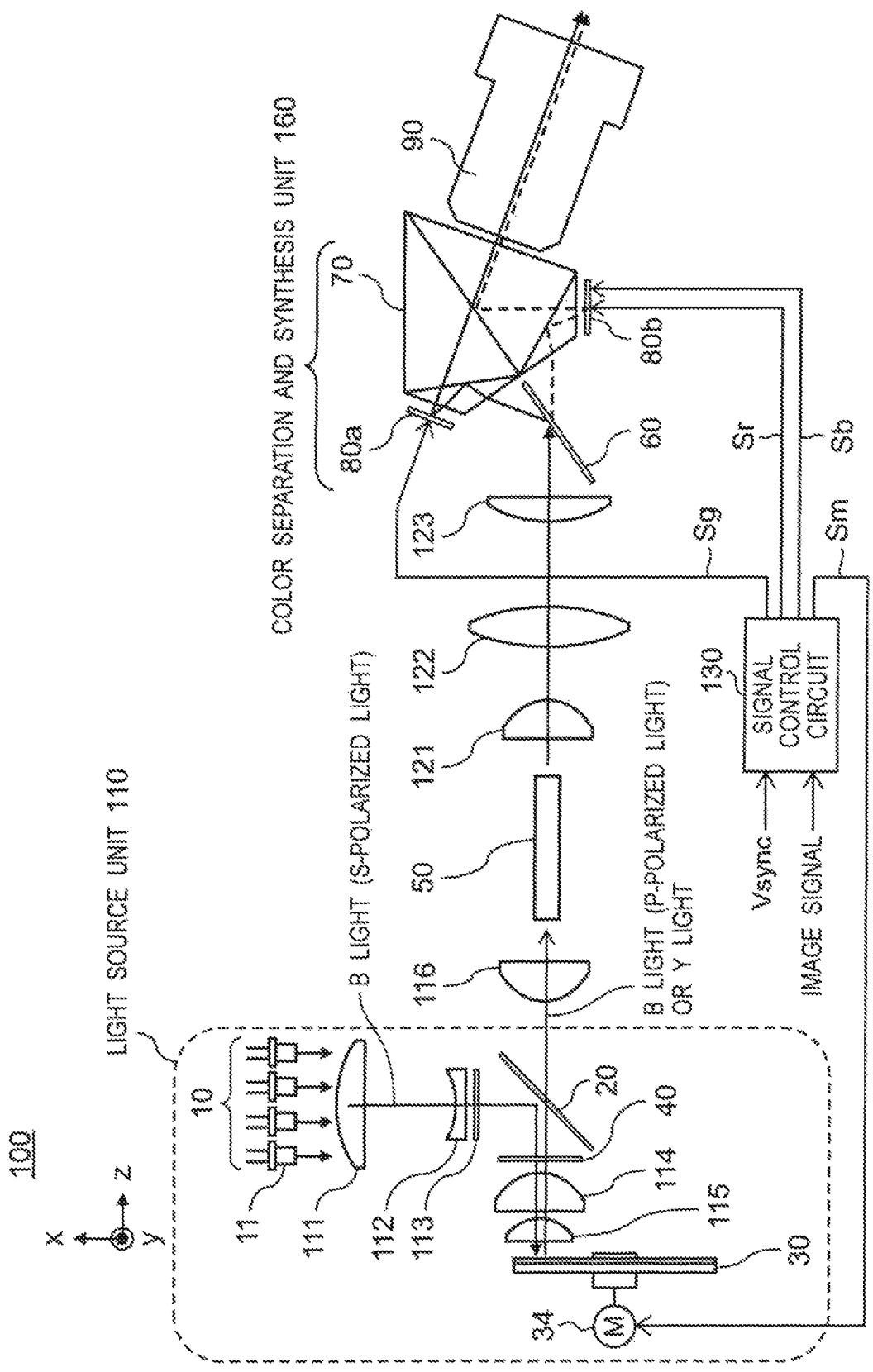
FIG. 1 is a schematic block diagram showing a configuration example of a projection-type image display apparatus according to a first embodiment.

FIG. 1 is a schematic block diagram showing an optical configuration of a projection-type image display apparatus 100 according to the first embodiment.

The projection-type image display apparatus 100 of FIG. 1 includes a light source 10, a dichroic mirror 20, a phosphor wheel 30, a λ/4 wavelength plate 40, a rod integrator 50, a color separation mirror 60, and a color synthesis prism unit 70, two digital mirror devices (DMDs) 80a and 80b, a projection unit 90, and a signal control circuit 130. In this case, it is assumed that the two DMDs 80a and 80b are referred to as a first DMD 80a and a second DMD 80b, respectively. The color separation mirror 60, the color synthesis prism unit 70, and the two DMDs 80a and 80b configure a color separation and synthesis unit 160.

The signal control circuit 130 is configured to generate a red (R) image signal Sr, a green (G) image signal Sg, a blue (B) image signal Sb, and a motor control signal Sm based on an input image signal and a vertical synchronization signal Vsync of the image signal. The green (G) image signal Sg is inputted to the first DMD 80a, while the red (R) image signal Sr and the blue (B) image signal Sb are inputted to the second DMD 80b. In addition, the motor control signal Sm is inputted to a motor 34, which rotates the phosphor wheel 30 having a disk shape.

For example, the light source 10 is configured to include a plurality of solid-state light sources such as laser diodes (LDs) and light emitting diodes (LEDs). In the present embodiment, laser diodes, particularly a plurality of laser diodes 11 each emitting blue light, are used as the solid-state light sources.

Light emitted from the light source 10 is blue light having a wavelength of 455 nm, and is used as image light and further as excitation light for exciting a phosphor of the phosphor wheel 30. However, the wavelength of the blue light emitted from the light source 10 is not limited to 455 nm, but may be a wavelength ranging from 440 nm to 460 nm, for example.

The blue light emitted from the light source 10 passes through a lens 111, a lens 112, and a diffusion plate 113, and enters the dichroic mirror 20. The dichroic mirror 20 reflects the blue light. The blue light reflected by the dichroic mirror 20 is converged by lenses 114 and 115, and excites the phosphor of the phosphor wheel 30 to emit light from the phosphor wheel 30.

In addition, the light emitted from the light source 10 is S-polarized blue light. The dichroic mirror 20 reflects the S-polarized blue light, and transmits yellow emission light emitted from the phosphor wheel 30 and P-polarized blue light reflected by the phosphor wheel 30. In other words, the dichroic mirror 20 reflects the S-polarized blue light, and transmits the P-polarized blue light and the non-polarized yellow emission light.

A light source unit 110 is configured to include the light source 10 including the laser diode 11, the lens 111, the lens 112, the diffusion plate 113, the dichroic mirror 20, the lenses 114 and 115, the phosphor wheel 30, the motor 34, and the λ/4 wavelength plate 40.

Figure 2A:
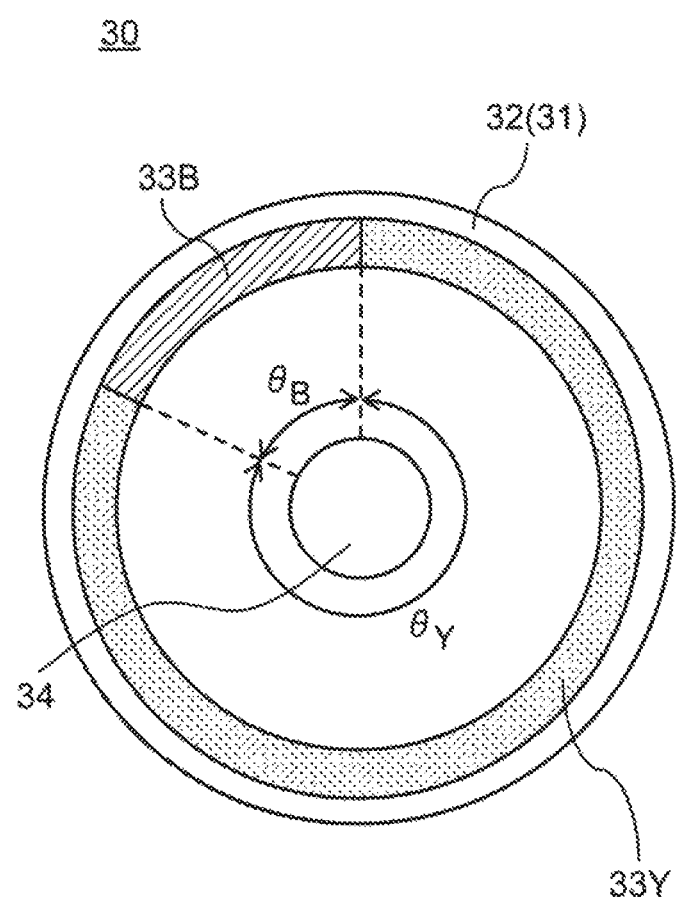
FIG. 2A is a plan view showing a configuration example of a phosphor wheel 30 of FIG. 1.
Figure 2B:
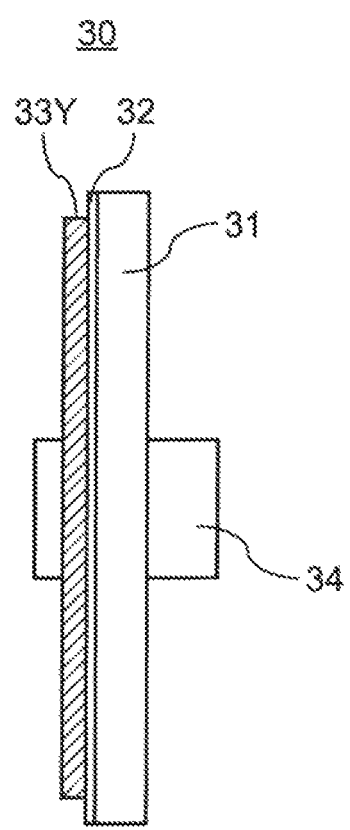
FIG. 2B is a side view of the phosphor wheel 30 of FIG. 2A.

As shown in FIGS. 2A and 2B, the phosphor wheel 30 includes a substrate 31, a reflection film 32 formed on the substrate 31, a yellow phosphor film 33Y and a diffusion layer 33B applied and formed in an annular shape on the reflection film 32, and the motor 34 for rotating the substrate 31. FIG. 2A is a plan view of the phosphor wheel 30 as viewed in a −z direction in FIG. 1, while FIG. 2B is a side view of the phosphor wheel 30 as viewed in a y direction in FIG. 1. It is noted that the reference numeral (31) included in the reference numerals 32 (31) in FIG. 2A indicates the substrate 31 in such a state that the reflection film 32 is not provided.

For example, the yellow phosphor film 33Y can be produced by mixing ceramic phosphor powder into an adhesive (silicone resin), applying the mixture to a substrate, and curing the adhesive at a high temperature. For example, the ceramic phosphor used for the yellow phosphor film 33Y is a YAG phosphor or a LAG phosphor, which is a cerium-activated garnet structure phosphor.

As shown in FIG. 2A, the phosphor wheel 30 is configured to include two segment regions in a circumferential direction. The first segment is a region having an angle θY and provided for generating yellow light Ye. The second segment is a region having an angle θB and provided for generating blue light B.

The yellow phosphor film 33Y includes a phosphor, which emits yellow emission light in accordance with blue light (excitation light) emitted from the light source 10. It is noted that the yellow phosphor film 33Y is a region to which blue light (excitation light) is applied during rotation of the phosphor wheel 30. In other words, the blue light is converted on the yellow phosphor film 33Y via the lens 115. Further, the diffusion layer 33B diffuses blue light (image light) emitted from the light source 10 while maintaining polarization. For example, the diffusion layer 33B has a refractive diffusion structure.

Returning to FIG. 1, when the blue light (excitation light) is applied to the first segment (region of angle θY) of the phosphor wheel 30, the emitted yellow light Ye is collimated by the lens 114 and the lens 115, and passes through the dichroic mirror 20. Emission light frozen the dichroic mirror 20 is converged on the rod integrator 50 via the lens 116.

When the blue light (image light) is applied to the second segment (region of angle θB) of the phosphor wheel 30, the S-polarized blue light passes through the λ/4 wavelength plate 40 and consequently becomes circularly polarized light. The circularly polarized light is reflected by the reflection film 32 while diffused by the diffusion layer 33B of the phosphor wheel 30, again passes through the λ/4 wavelength plate 40, and consequently becomes P-polarized light. The blue light B, which has become P-polarized light, passes through the dichroic mirror 20, and is converged on the rod integrator 50 via the lens 116.

In this manner, the phosphor wheel 30 generates the yellow light Ye by receiving blue light applied as exciting light to the first segment (region of angle θY), and generates the blue light B as image light by receiving blue light applied to the second segment (region of angle θB). In addition, the phosphor wheel 30 is rotated by rotation of the motor 34 in accordance with a motor control signal received from the signal control circuit 130 to generate the yellow light Ye and the blue light B (image light) in a time-division manner. Accordingly, the yellow light Ye and the blue light B (image light) enter the rod integrator 50 in a time-division manner, both entering as white light when time-averaged.

The rod integrator 50 is a solid rod formed by a transparent material such as glass. The rod integrator 50 equalizes the white light (yellow light Ye+blue light B) generated by the phosphor wheel 30. It is noted that the rod integrator 50 may be a hollow rod, which has an inner wall configured to include a mirror surface. The rod integrator 50 is an example of a light equalizing element. Further, a lens 121, a lens 122, and a lens 123 are relay optical systems for guiding light equalized by the rod integrator 50 to the DMD 80a and the DMD 80b via the color separation mirror 60.

Figure 3:
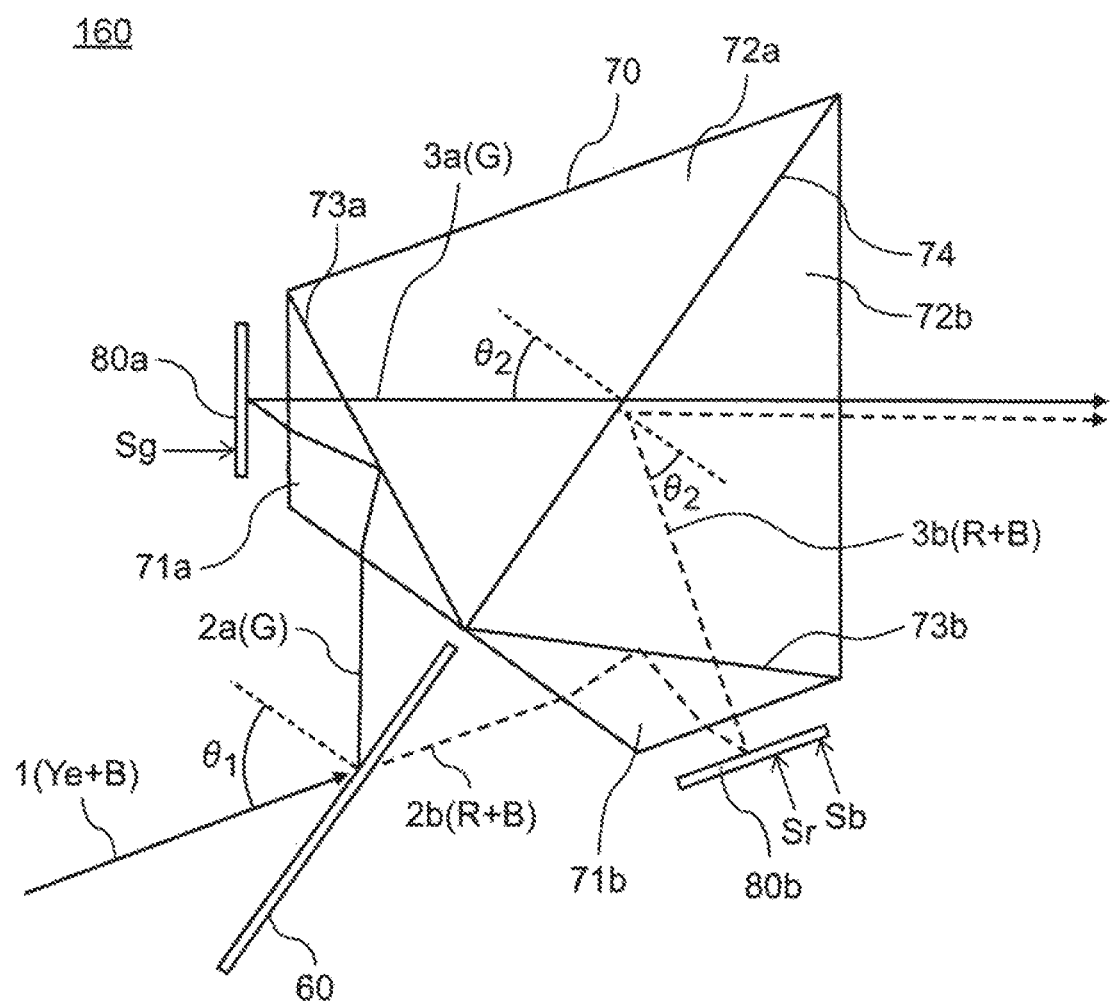
FIG. 3 is a plan view showing a detailed configuration example of a color separation and synthesis unit 160 of FIG. 1.

A detailed configuration example of the color separation and synthesis unit 160 will be next described with reference to FIG. 3. The color separation and synthesis unit 160 shown in FIG. 3 includes the color separation mirror 60, the color synthesis prism unit 70, the first DMD 80a, and the second DMD 80b. In FIG. 3, only a ray passing through the center of the optical axis (reference ray) is indicated by a solid line and a broken line.

Referring to FIG. 3, the color separation mirror 60 is a dichroic mirror, which separates white light emitted from the rod integrator 50 into light in an optical path extending toward the first DMD 80*a* and light in an optical path extending toward the second DMD 80*b*. In the present embodiment, the color separation mirror 60 reflects the green light G, and transmits the red light R and the blue light B. More specifically, as shown in FIG. 3, white illumination light 1 (Ye+B) is separated by the color separation 60 into first illumination light 2*a* (G) and second illumination light 2*b* (R+B). The first illumination light 2*a* (G) is an example of first color light, while the second illumination light 2*b* (R+B) is an example of second color light. In this case, R indicates red, G indicates green light, B indicates blue, and Ye indicates yellow.

As shown in FIG. 3, four prisms of a prism 71*a*, a prism 71*b*, a prism 72*a*, and a prism 72*b* included in the color synthesis prism unit 70 are bonded with each other via a first air gap surface 73*a*, a second air gap surface 73*b*, and a dichroic film 74 to configure an integrated prism unit.

As shown in FIG. 3, each of the four prisms 71*a*, 71*b*, 72*a*, and 72*b* configuring the color synthesis prism unit 70 has a triangular prism shape having a constant thickness in the depth direction with respect to the surface of the figure (direction perpendicular to the surface of the figure). Each of the two prisms 71*a* and 71*b* of the four prisms configuring the color synthesis prism unit 70 has a plane-symmetric shape and arrangement with respect to a plane of symmetry corresponding to a plane including the dichroic film 74. Each of the prism 72*a* and the prism 72*b* has a plane-symmetric shape and arrangement with respect to a plane of symmetry corresponding to the plane including the dichroic film 74. Further, the two prisms 72*a* and 72*b* of the four prisms configuring the color synthesis prism unit 70 are arranged in such positions as to face each other with the dichroic film 74 interposed between the two prisms 72*a* and 72*b*.

In the present embodiment, the prism 71*a*, the prism 71*b*, the prism 72*a*, and the prism 72*b* are made of common glass material BK7. The glass material may be any material usable for optical applications, and may be changed to other materials in accordance with optical designs.

A minute gap (air layer) is provided between the first air gap surface 73*a* and the second air gap surface 73*b* to cause total reflection when an incident angle of a ray entering the air gap surface exceeds a critical angle. However, the first air gap surface 73*a* and the second air gap surface 73*b* are bonded to each other by an adhesive in a region where light does not enter. For example, a clearance of the air gap is approximately in the range from 2 μm to 10 μm.

In the present embodiment, the dichroic film 74 reflects the red light R and the blue light B, and transmits the green light G. The dichroic film 74 is coated on either a surface of the prism 72*a* or a surface of the prism 72*b*. The prism 72*a* and the prism 72*b* are in optical contact with each other via an adhesive. The prism 72*a* and the prism 72*b* may be bonded to each other by optical contact. The color synthesis prism unit 70 is a prism, which has both functions of a TIR prism and a dichroic prism generally used in a projection-type image display apparatus using DMDs.

Each of the first DMD 80*a* and the second DMD 80*b* modulates light equalized by the rod integrator 50. Specifically, each of the first DMD 80*a* and the second DMD 80*b* is a reflective display element configured to include a plurality of micro-mirrors. The plurality of micro-mirrors are movable. Each of the micro-mirrors basically corresponds to one pixel. Each of the first DMD 80*a* and the second DMD 80*b* selectively switches over on-light (projection light) and off-light (unnecessary light) by a modulation operation, which changes an angle of each micro-mirror in accordance with the input image signals Sg, Sr, and Sb. In this case, the first DMD 80*a* is an example of a first light modulation element, while the second DMD 80*b* is an example of a second light modulation element.

The first illumination light 2*a* (G) reflected by the color separation mirror 60 enters the prism 71*a*, and is totally reflected on the first air gap surface 73*a* and then applied to the first DMD 80*a*. The prism shape is determined such that the incident angle of the first illumination light 2*a* (G) entering the first air gap surface 73*a* exceeds a critical angle. In the present embodiment, the glass material is BK7, and the refractive index is 1.5187 (when the wavelength is 546.1 nm). Accordingly, the critical angle is calculated as an angle of 41.18 degrees. The first projection light 3*a* (G), which has become the ON-light at the first DMD 80*a*, enters the prism 71*a* again, passes through the first air gap surface 73*a*, passes through the dichroic film 74, and then goes out.

The prism shape is determined such that the incident angle of the first projection light 3*a* (G) entering the first air gap surface 73*a* becomes smaller than the critical angle. The reference ray of the first projection light 3*a* (G) emitted from the first DMD 80*a* is perpendicular to the first DMD 80*a*. In other words, the incident angle of the reference ray of the first illumination light 2*a* (G) entering the first DMD 80*a* is controlled such that the reference ray of the first projection light 3*a* (G) becomes perpendicular to the first DMD 80*a*. In the present embodiment, the incident angle of the reference ray of the first illumination light 2*a* (G) entering the first DMD 80*a* is set to 34 degrees.

The second illumination light 2*b* (R+B) having passed through the color separation mirror 60 enters the prism 71*b*, and is totally reflected on the second air gap surface 73*b* and applied to the second DMD 80*b*. The prism shape is determined such that the incident angle of the second illumination light 2*b* (R+B) entering the second air gap surface 73*b* exceeds a critical angle. In the present embodiment, the glass material is BK7, and the refractive index is 1.5187 (when the wavelength is 546.1 nm). Accordingly, the critical angle is calculated as an angle of 41.18 degrees. The second projection light 3*b* (R+B), which has become the on-light at the second DMD 80*b*, enters the prism 71*b* again, passes through the second air gap surface 73*b*, reflects on the dichroic film 74, and then goes out.

The prism shape is determined such that the incident angle of the second projection light 3*b* (R+B) entering the second air gap surface 73*b* becomes smaller than the critical angle. The reference ray of the second projection light 3*b* (R+B) emitted from the second DMD 80*b* is perpendicular to the second DMD 80*b*. In other words, the incident angle of the reference ray of the second illumination light 2*b* (R+B) entering the second DMD 80*b* is controlled such that the reference ray of the second projection light 3*b* (R+B) becomes perpendicular to the second. DMD 80*b*. In the present embodiment, the incident angle of the reference ray of the second illumination light 2*b* (R+B) entering the second DMD 80*b* is set to 34 degrees.

In this case, it is assumed that an incident angle of the white illumination light 1 (Ye+B) entering the color separation mirror 60 (the angle formed by the plane-normal and the reference ray) is an incident angle $\theta 1$, and that an incident angle of each of the reference rays of the first projection light 3*a* (G) and the second projection light 3*b* (R+B) entering the dichroic film 74 of the color synthesis prism unit 70 (the angle formed by the plane-normal and the reference ray) is an incident angle $\theta 2$ as shown in FIG. 3. Then, each of the incident angle $\theta 1$ and the incident angle $\theta 2$ is preferably the smallest possible angle. Specifically, it is preferable that the incident angle θ1 falls within the range equal to or smaller than 60 degrees, and that the incident angle θ2 falls within the range equal to or smaller than 45 degrees. In the present embodiment, the incident angle θ1 set to 55 degrees, while the incident angle θ2 is set to 35 degrees. Accordingly, the incident angle θ1 falls within the range equal to or smaller than 60 degrees, and the incident angle θ2 falls within the range equal to or smaller than 45 degrees. Under these settings of angles, the coating design of the color separation mirror 60 and the coating design of the dichroic film 74 are facilitated, and efficiency in color separation and synthesis improves.

In addition, it is simultaneously preferable that the incident angle θ1 is larger than the incident angle θ2. In the present embodiment, the incident angle θ1 is set to 55 degrees, while the incident angle θ2 is set to 35 degrees. Accordingly, such a relationship that the incident angle θ1 is larger than the incident angle θ2 holds. Under these settings of angles, the coating design of the color separation mirror 60 and the coating design of the dichroic film 74 are facilitated, and efficiency in color separation and synthesis improves.

In this manner, the first illumination light 2a (G) and the second illumination light 2b (R+B) separated from the white illumination light 1 (Ye+B) by the color separation mirror 60 are synthesized by the color synthesis prism unit 70, and emitted as synthesis light.

It is noted that the color separation mirror 60 of the present embodiment is configured to reflect the green light G and transmit the red light R and the blue light B, but may be configured to reflect the red light. R and the blue light B and transmit the green light G. In addition, the dichroic film 74 of the present embodiment is configured to reflect the red light R and the blue light B and transmit the green light G, but may be configured to reflect the green light G and transmit the red light R and the blue light B.

The operation of color image display using the first DMD 80a and the second DMD 80b will be next described with reference to FIG. 4A.

Figure 4A:
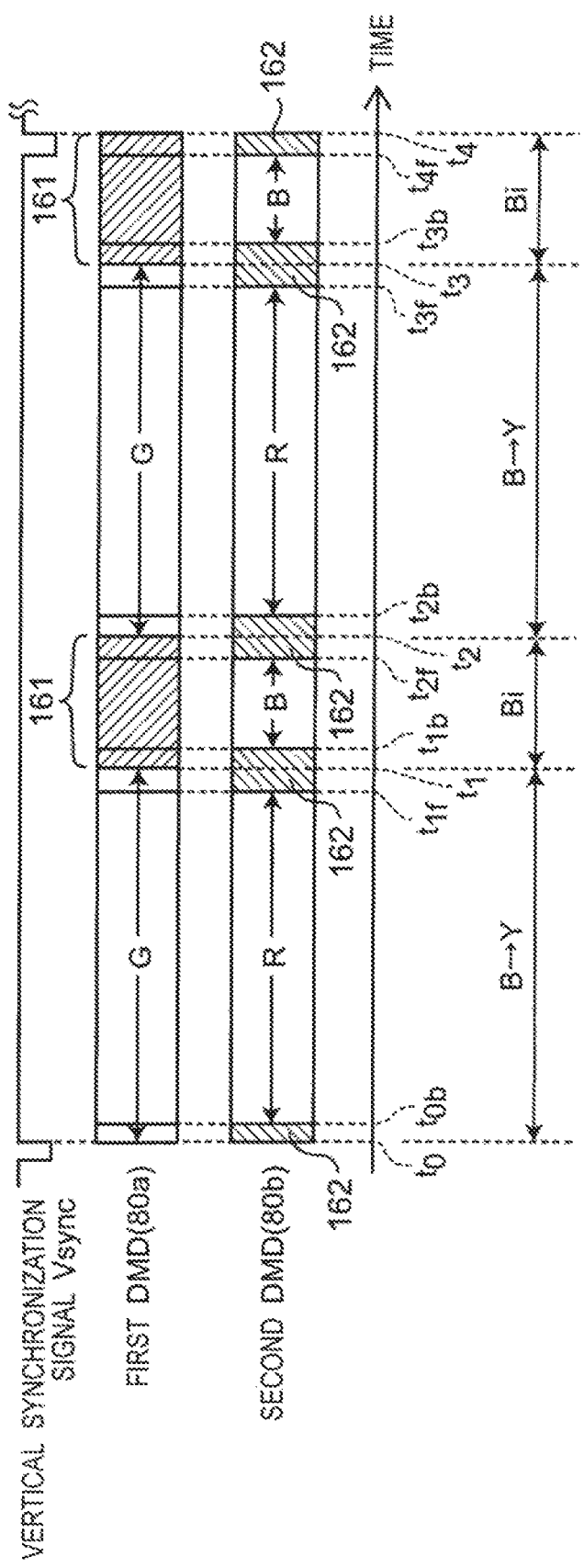
FIG. 4A is a timing chart showing an operation of a reflective display element included in the projection-type image display apparatus of FIG. 1.

Referring to FIG. 4A, the first DMD 80a achieves gradation expression of the green light G by the modulation operation of each micromirror based on the green (G) image signal Sg. Specifically, gradation expression of the green light G is performed from a time t0 to a time t1, while image displaying is not performed in the period 161 including the time t1 to a time t2. Gradation expression of the green light G is performed from the time t2 to a time t3, while image displaying is not performed from the time t3 to a time t4. While not shown, the same processing is repeated after the time t4 based on the image signal Sg.

The second DMD 80b achieves gradation expression of the red light R and the blue light B in accordance with the modulation operation of each micromirror based on the red (R) image signal Sr and the blue (B) image signal Sb. Specifically, gradation expression of the red light R is performed from a time t0b to a time t1f, and gradation expression of the blue light B is performed from a time t1b to a time t2f. Gradation expression of the red light R is performed from a time t2b to a time t3f, and gradation expression of the blue light B is performed from a time t3b to a time t4f. For the period 162 including the period from the time t0 to the time t0b, the period from the time t1f to the time t1b, the period from the time t2f to the time t2b, the period from the time t3f to the time t3b, and the period from the time t4f to the time t4, gradation expression during mixture of red and blue is performed. This gradation expression during mixture of red and blue may be used, but need not be used. While not shown, the same processing is repeated after the time t4 based on the image signals Sr and Sb.

In this case, each of the period from the time t0 to the time t1 and the period from the time t2 to the time t3 corresponds to the period, for which the blue light is applied as excitation light to the first segment (region of angle θY) of the phosphor wheel 30. More specifically, for the periods from the time t0 to the time t1 and from the time t2 to the time t3, the yellow light Ye is generated by the phosphor wheel 30 and then separated into the green light G and the red light R by the color separation mirror 60. The green light G is applied to the first DMD 80a, and the red light R is applied to the second DMD 80b.

Each of the period from the time t1 to the time t2 and the period from the time t3 to the time t4 corresponds to the period, for which the blue light is applied as image light Bi to the second segment (region of angle θB) of the phosphor wheel 30. More specifically, for the periods from the time t1 to the time t2 and from the time t3 to the time t4, the blue light is reflected by the phosphor wheel 30 and separated into light in an optical path guiding the light toward the second DMD 80b by the color separation mirror 60 to apply the image light Bi of the blue light B to the second DMD 80b.

In this case, the period 162 including the period from the time t0 to the time t0b, the period from the time t1f to the time t1b, the period from the time t2f to the time t2b, the period from the time t3f to the time t3b, and the period from the time t4f to the time t4 corresponds to the period of the boundary between the colors of the phosphor wheel 30, namely, the spoke period 162, for which adjacent colors are mixed. However, during this period, only the green light G is applied to the first DMD 80a. Accordingly, this period can be used as a primary color period of the green light G.

Action and Effect

According to the first embodiment, the spoke period 162, which includes the period from the time t0 to the time t0b, the period from the time t1f to the time t1, the period from the time t2 to the time t2b, and the period from the time t3f to the time t3, corresponding to the period, for which adjacent colors are mixed on the phosphor wheel 30, is also used to produce the green primary color. Accordingly, all the green lights can be used to produce a primary color, allowing a projection-type image display apparatus capable of preventing a drop of intensity of the green primary color to be provided.

In addition, the signal control circuit 130 may perform such control that an ON-state time (on-time) of the spoke period 162 changes in a stepped manner as shown in FIG. 4B, for example, in accordance with the luminance of the green light C as a primary color in the spoke period 162. According to the characteristic example in FIG. 4B, the spoke period 162 is so controlled as to increase as the luminance of the green light increases.

Second Embodiment

In the first embodiment, the color separation mirror 60 is configured to reflect the green light G, and transmit the red light R and the blue light B. In addition, in the first embodiment, the dichroic film 74 is configured to reflect the red light R and the blue light B, and transmit the green light G. In other words, in the foregoing configuration, the white illumination light 1 (Ye+B) is separated into the first illumination light 2a (G) and the second illumination light 2b (R+B) by the color separation mirror 60, and the first projection light 3a (G) and the second projection light 3b (R+B) are synthesized to each other by the dichroic film 74 of the color synthesis prism unit 70.

Figure 5:
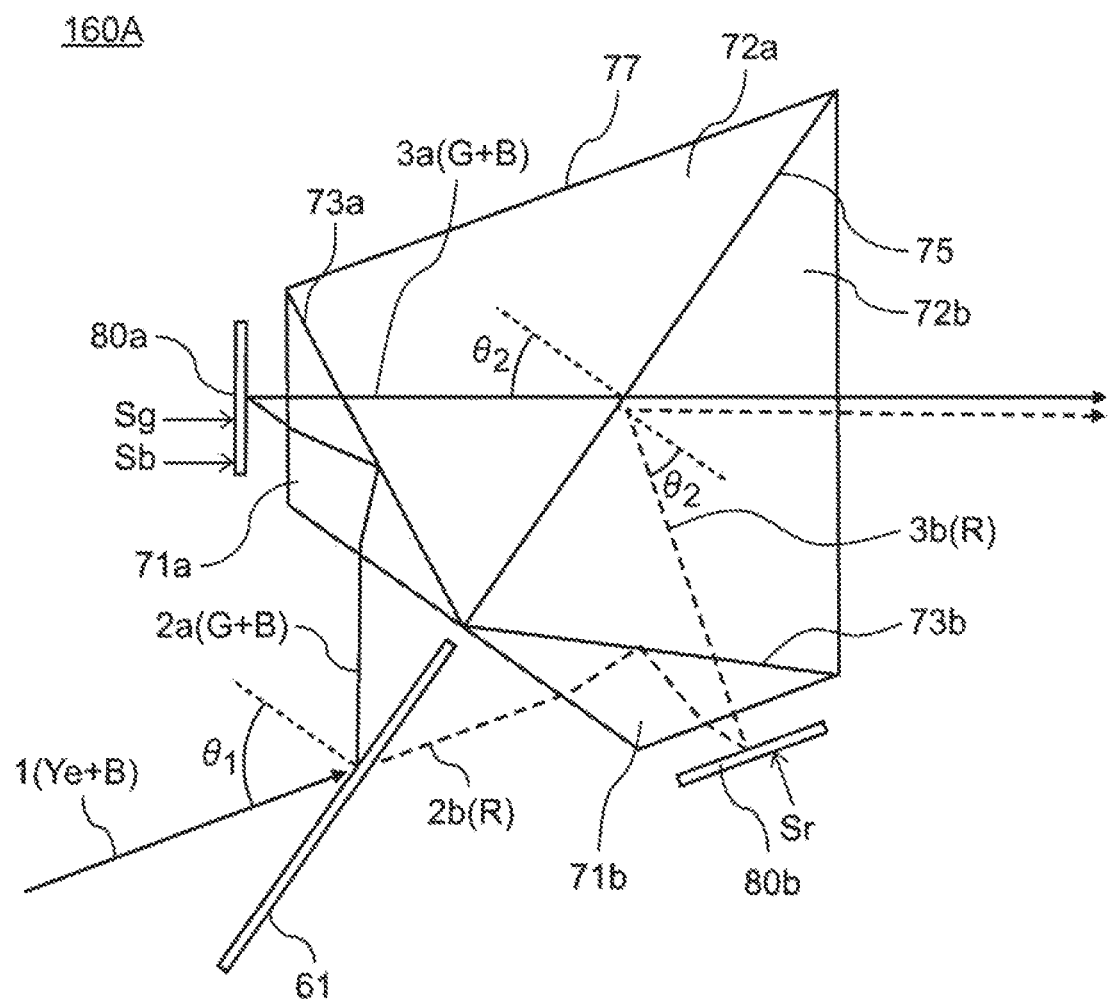
FIG. 5 is a plan view showing a detailed configuration example of a color separation and synthesis unit 160A according to a second embodiment.

However, a second embodiment of FIG. 5 is different from the first embodiment of FIG. 3 in following points when these embodiments are compared with each other:

(1) The color separation mirror 61 is disposed instead of the color separation mirror 60. The color separation mirror 61 reflects green light G and blue light B, and transmits red light R.

(2) In addition, the color synthesis prism unit 77 includes the dichroic film 75 instead of the dichroic film 74. The dichroic film 75 transmits the green light G and the blue light B, and reflects the red light R. In other words, white illumination light 1 (Ye+B) is separated into first illumination light 2a (G+B) and second illumination light 2b (R) by the color separation mirror 61, while the first projection light 3a (G+B) and the second projection light 3b (R) are synthesized by the dichroic film 75 of the color synthesis prism unit 77. In this manner, a color separation and synthesis unit 160A shown in FIG. 5 includes the color separation mirror 61, the color synthesis prism unit 77, a first DMD 80a, and a second DMD 80b.

The first illumination light 2a (G+B) herein is an example of first color light, while the second illumination light 2b (R) is an example of the second color light. It is noted that configurations similar to the corresponding configurations of the first embodiment are given identical reference numerals, and the same description is not repeated.

According to the color separation and synthesis unit 160A shown in FIG. 5, the first illumination light 2a (G+B) reflected by the color separation mirror 61 enters a prism 71a, and is totally reflected on a first air gap surface 73a and applied to the first DMD 80a. The first projection light 3a (G+B) reflected and turned into the on-light by the first DMD 80a enters the prism 71a again, passes through the first air gap surface 73a, passes through the dichroic film 75, and then goes out.

In addition, the second illumination light 2b (R) having passed through the color separation mirror 61 enters a prism 71b, and is totally reflected on a second air gap surface 73b and applied to the second DMD 80b. The second projection light 3b (R) reflected and turned into the on-light by the second DIVED 80b enters the prism 71b again, passes through the second air gap surface 73b, reflects on the dichroic film 75, and then goes out.

It is noted that the incident angle of the first illumination light 2a (G+B) entering the first air gap surface 73a and the first MID 80a, and the incident angle of the first projection light 3a (G+B) entering the first air gap surface 73a are similar to the corresponding incident angles in the first embodiment. Similarly, the incident angle of the second illumination light 2b (R) entering the second air gap surface 73b and the second DMD 80b, and the incident angle of the second projection light 3b (R) entering the second air gap surface 73b are similar to the corresponding incident angles in the first embodiment.

In addition, as shown in FIG. 5, an incident angle θ1 of the white illumination light 1 (Ye+B) entering the color separation mirror 61, an incident angle θ2 of each of the reference rays of the first projection light 3a (G+B) and the second projection light 3b (R) entering the dichroic film 75 of the color synthesis prism unit 77, and the relationship between the incident angle θ1 and the incident angle θ2 are similar to the corresponding angles and relationship of the first embodiment.

It is noted that the color separation mirror 61 of the present embodiment is configured to reflect the green light G and the blue light B and transmit the red light R, but may be configured to reflect the red light R and transmit the green light G and the blue light B. In addition, the dichroic film 75 of the present embodiment is configured to reflect the red light R and transmit the green light G and the blue light B, but may be configured to reflect the green light G and the blue light B and transmit the red light R.

Figure 6:
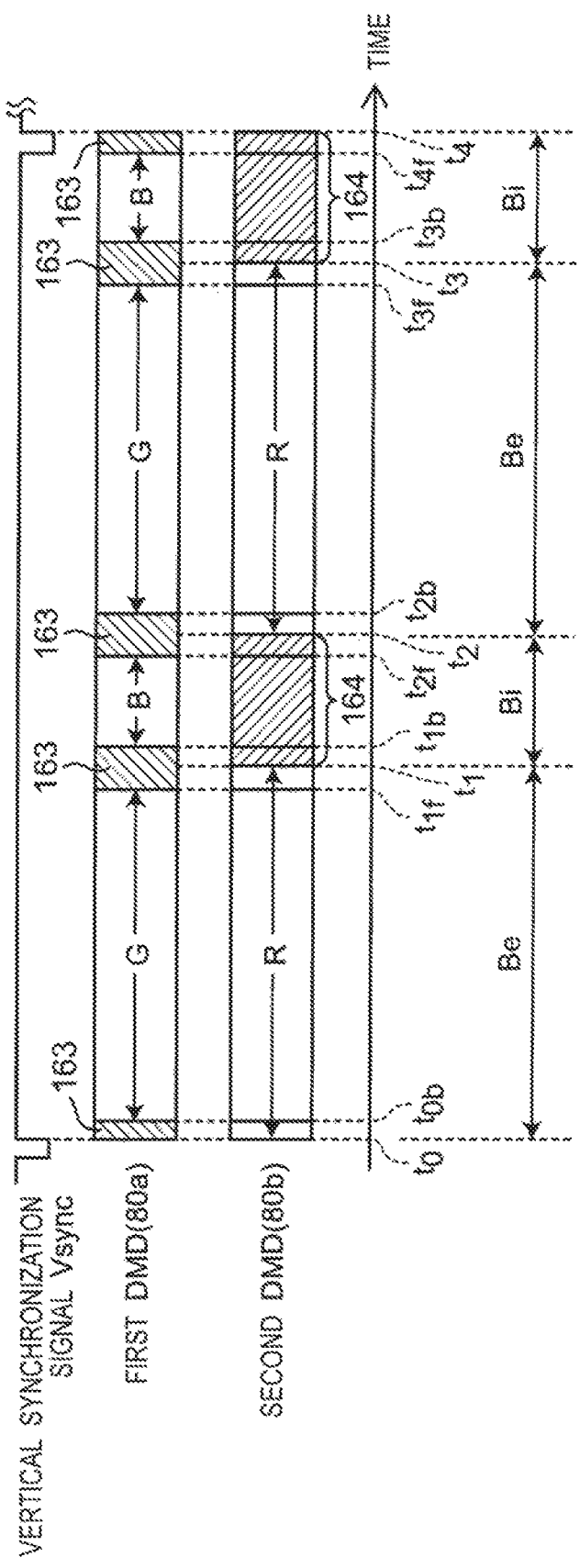
FIG. 6 is a timing chart showing an operation of a reflective display element included in the projection-type image display apparatus, which includes the color separation and synthesis unit 160A of FIG. 5.

The principle of color image displaying of the second embodiment will be described with reference to FIG. 6.

The first DMD 80a achieves gradation expression of the green light G and the blue light B in accordance with the modulation operation of each micromirror based on a green (G) image signal Sg and a blue (B) image signal Sb. Specifically, gradation expression of the green light G is performed from a time t0b to a time t1f, and gradation expression of the blue light B is performed from a time t1b to a time t2f. Gradation expression of the green light G is performed from a time t2b to a time t3f, and gradation expression of blue light B is performed from a time tab to a time t4f. For the period 163 including the period from the time t0 to the time t0b, the period from the time t1f to the time t1b, the period from the time t2f to the time t2b, the period from the time t3f to the time t3b, and the period from the time t4f to a time t4, gradation expression is performed during mixture of green and blue. This gradation expression during mixture of green and blue may be used, but need not be used. While not shown, the same processing is repeated after the time t4 based on the image signals Sg and Sb.

The second DMD 80b achieves gradation expression of the red light R in accordance with the modulation operation of each micromirror based on a red (R) image signal Sr. Specifically, gradation expression of the red light R is performed from the time t0 to the time t1, while image displaying is not performed for the period 164 from the time t1 to the time t2. Gradation expression of the red light R is performed from the time t2 to the time t3, while image displaying is not performed for the period 164 from the time t3 to the time t4. While not shown, the same processing is repeated after the time t4 based on the image signal Sr.

In this case, in a manner similar to that of the first embodiment, each of the period from the time t0 to the time t1 and the period from the time t2 to the time t3 corresponds to the period, for which blue light is applied as excitation light to the first segment (region of angle θY) of the phosphor wheel 30. Each of the period from the time t1 to the time t2 and the period from the time t3 to the time t4 corresponds to the period, for which blue light is applied as image light to the second segment (region of angle θB) of the phosphor wheel 30. According to the second embodiment, for the period 164 including the periods from the time t1 to the time t2 and from the time t3 to the time t4, the blue light reflected by the phosphor wheel 30 is separated into light in an optical path guiding the light toward the first DMD 80a by the color separation mirror 61, and applied to the first DMD 80a.

In this case, the period 163 including the period from the time t0 to the time t0b, the period from the time t1f to the time t1b, the period from the time t2f to the time t2b, the period from the time t3f to the time t3b, and the period from the time t4f to the time t4 corresponds to the period of the boundary between the colors of the disk, namely, a so-called spoke period, for which adjacent colors are mixed. However, during this period, only the red light R is applied to the second DMD 80b. Accordingly, this period can be used as a primary color period of the red light R. The signal control circuit 130 may perform such control that an ON-state time (on-time) of the spoke period 163 changes in a stepped manner similar to that of the case shown in FIG. 4B, for example, in accordance with the luminance of the red light R as a primary color in the spoke period 163.

When the color separation and synthesis unit 160A includes the color synthesis prism unit 77 including the color separation mirror 61 and the dichroic film 75 in a manner similar to that of the second embodiment, effects similar to those of the first embodiment are similarly produced.

Action and Effect

According to the second embodiment, the period including the period from the time t0 to the time t0b, the period from the time t1f to the time t1, the period from the time t2 to the time t2b, and the period from the time t3f to the time t3, corresponding to the period, for which adjacent colors are mixed on the phosphor wheel 30, is also used to produce the red primary color. Accordingly, all the red lights can be used to produce a primary color, allowing such a projection-type image display apparatus capable of preventing a drop of intensity of the red primary color to be provided.

In addition, the signal control circuit 130 may perform such control that an ON-state time (on-time) of the spoke period 163 changes in a stepped manner as shown in FIG. 4B, for example, in accordance with the luminance of the red light R as a primary color in the spoke period 163. In this case, the spoke period 163 is so controlled as to increase as the luminance of the red light R increases.

Other Embodiments

The first and second embodiment has been described above by way of example of the technology disclosed in the present application. However, the technology of the present disclosure is not limited to these embodiments, but is applicable to embodiments including changes, replacements, additions, omissions and the like. In addition, the other embodiments may be added by combining the respective components described in the first and second embodiments. Accordingly, the other embodiments will be hereinafter presented by way of example.

According to the first and second embodiments, blue light is formed as image light by causing reflection on the reflection film 32 along with diffusion by the diffusion layer 33B of the phosphor wheel 30. However, embodiments are not limited to this embodiment. Blue light entering the second segment (region of angle θB) of the phosphor wheel 30 may be transmitted through an opening formed at a portion where the diffusion layer 33B of the phosphor wheel 30 is provided, and may be guided again toward the dichroic mirror 20 by reflection on a mirror and then guided toward the lens 116 by reflection on the dichroic mirror 20. In this manner, white light time-divided into blue light (image light) and yellow light can be similarly obtained.

According to the first and second embodiments, the solid-state light sources as the optical unit, and the phosphor wheel 30 as the disk are described by way of example. However, the other embodiments may be adopted. The optical unit may be a lamp, and the disk may be a color wheel.

It is noted that various changes, substitutions, additions, omissions, and the like within the scope of the appended claims or an equivalent thereof may be made for the embodiment described herein by way of example of the technology of the present disclosure.

The present disclosure is applicable to a projection-type image display apparatus such as a projector.

What is claimed is:

1. A projection-type image display apparatus comprising:
a light source;
a disk that generates a plurality of color lights in a time-division manner based on emission light from the light source unit;
a color separator that separates first, second, and third primary colors from the plurality of color lights generated by the disk;
a first light modulation element that modulates the separated first and second primary colors according to an input first image signal to generate a first image light;
a second light modulation element that modulates the separated third primary color according to an input second image signal to generate a second image light; and
a control circuit configured to: control the first and second light modulation elements such that the second light modulation element becomes an ON-state during a spoke period of the disk upon displaying the third primary color as a single color; and control the second light modulation element such that a time of the ON-state during the spoke period changes according to luminance of the third primary color.

2. The projection-type image display apparatus as claimed in claim 1,
wherein the first primary color is red, the second primary color is blue, and the third primary color is green.

3. The projection-type image display apparatus as claimed in claim 1,
wherein the first primary color is green, the second primary color is blue, and the third primary color is red.

* * * * *